United States Patent [19]

Taguchi et al.

[11] Patent Number: 4,730,881
[45] Date of Patent: Mar. 15, 1988

[54] MONITOR DISPLAY UNIT

[75] Inventors: Masahiro Taguchi, Hazu; Satosi Kuwakado; Kuniaki Nakamura, both of Nukata, all of Japan

[73] Assignee: Nippon Soken, Inc., Nishio, Japan

[21] Appl. No.: 927,591

[22] Filed: Nov. 6, 1986

[30] Foreign Application Priority Data

Nov. 18, 1985 [JP]  Japan .............................. 60-258391

[51] Int. Cl.⁴ ............................................... G03H 1/02
[52] U.S. Cl. ................................... 350/3.77; 350/3.85
[58] Field of Search ..................... 350/3.6, 3.67, 3.77, 350/3.85, 3.86; 362/800

[56] References Cited

U.S. PATENT DOCUMENTS 3,560,921  2/1971  Lopez .................................. 350/3.85
4,573,759  3/1986  Swift .................................. 350/3.85

FOREIGN PATENT DOCUMENTS 2161615A  6/1985  United Kingdom ............... 350/3.6

Primary Examiner—Brucey Arnold
Assistant Examiner—Kevin Fournier
Attorney, Agent, or Firm—Cushman Darby & Cushman

[57] ABSTRACT

A monitor display unit having a hologram dry plate, formed by coating a glass base plate with sensitive material, and installed in an instrument panel of a vehicle. On the hologram dry plate are multiply recorded light interference fringes of three-dimensional images of the vehicle seen from the front and the rear of the vehicle. Two image reproduction lamps for illuminating reproduction light toward the hologram dry plate are provided on the right front and the left front of the hologram dry plate. When one image reproduction lamp is lighted, one three-dimensional image is reproduced on the hologram dry plate. Light emission diodes are provided rearward of the hologram dry plate so as to correspond to the positions of lamps on the three-dimensional image. The light emission of the light emission diodes is recognized through the hologram dry plate. A control circuit operates one of the image reproduction lamps to reproduce one three-dimensional image indicating the positions of the monitored lamps and to light the light emissions diodes corresponding to the monitored lamps on the three-dimensional image.

6 Claims, 7 Drawing Figures

F I G.1
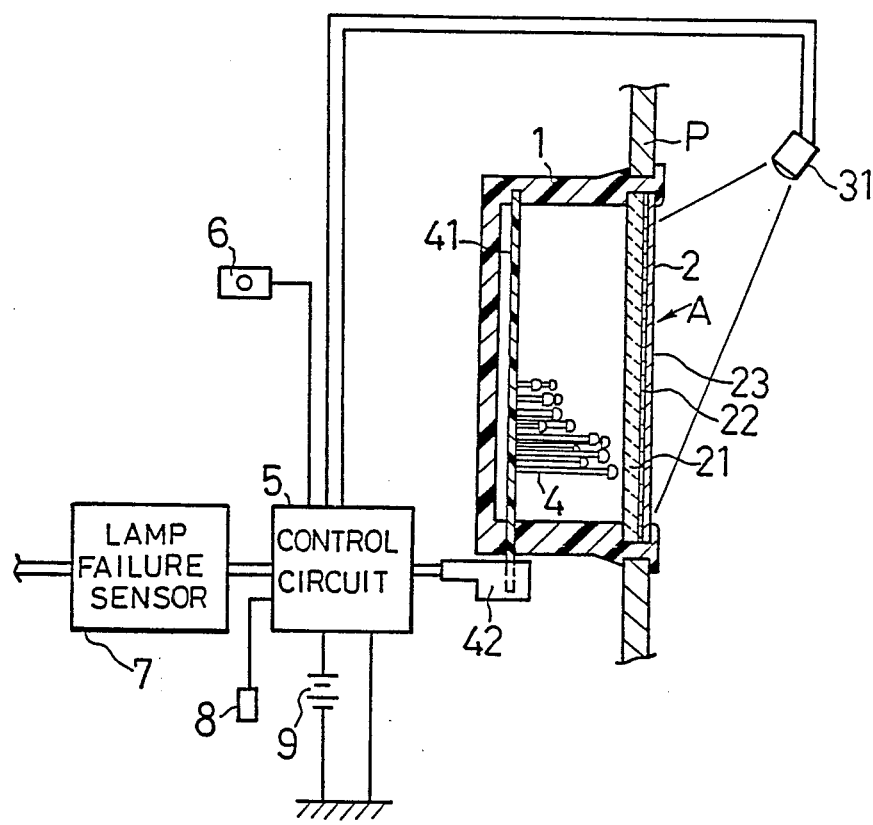

MONITOR DISPLAY UNIT

BACKGROUND OF THE INVENTION

1. Field of the Invention

The present invention relates to a monitor display unit, and more particularly to a three-dimensional monitor display unit employing holography.

2. Description of the Prior Art

Conventionally, in order to monitor equipments mounted on a vehicle from a driver's seat, display lamps, each corresponding to each of the equipments have been provided on an instrument panel. However, in this case, the number of display lamps is restricted because of the limited space.

Recently, the number of equipments to be monitored has been increased due to the development of car electronics.

Therefore, such a monitor display unit as being capable of informing a driver of monitor information from a large number of equipments mounted on a vehicle without occupying large space has been demanded.

SUMMARY OF THE INVENTION

It is one object of the present invention to provide a monitor display unit capable of displaying monitor information from a large number of equipments on a display surface of limited space.

It is another object of the present invention to provide a monitor display unit by which the arranged positions of equipments to be monitored can be certainly observed by a monitoring person with his single glance.

The monitor display unit of the present invention comprises a hologram dry plate for multiply recording light interference fringes of a plurality of three-dimensional images which indicate the arrangement of equipments to be monitored, image reproduction light illuminating means, each being directed toward the hologram dry plate at a different angle from each other for illuminating reproduction light toward the hologram dry plate thereby to reproduce one of the three-dimensional images on the hologram dry plate, light emitting means, each being provided in a position corresponding to each of the equipments of the three-dimensional images reproduced by the image reproduction light illuminating means, and control means for operating the image reproduction light illuminating means to reproduce a desired one of the three-dimensional images, which indicates the arrangement of equipments to be monitored and for lighting the light emitting means corresponding to the equipments to be monitored.

One of the reproduction illuminating means is operated by the control means in accordance with monitor signals. And one of the three-dimensional images is reproduced and at the same time the light emitting means corresponding to a specific portion of the three-dimensional images is operated.

According to the monitor display unit of the present invention, a three-dimensional image is displayed in accordance with the monitor signal and the specific portion of the displayed image is made emit light. This results in the monitor information can be speedily and certainly observed.

Furthermore, a plurality of three-dimensional images can be selectively displayed on a display surface of limited space. This results in the whole device can be made compact.

BRIEF DESCRIPTION OF THE DRAWINGS

FIG. 1 is a diagram of a monitor display unit according to the present invention, including a sectional view of a main portion thereof;

DETAILED DESCRIPTION OF THE EMBODIMENTS

Figure 5:
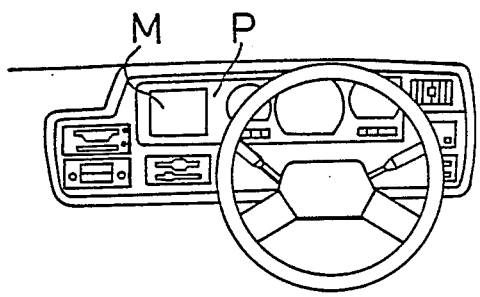
FIG. 5 is a front view of an instrument panel of a vehicle, in which a monitor display unit according to the present invention is installed.

In FIG. 5, a monitor display unit M according to the present invention is installed in an instrument panel P of a driver's seat.

As shown in FIG. 1, the monitor display unit M has a casing 1 having an open end. The opening edge of the casing 1 is fixed to the instrument panel P by caulking. The opening of the casing 1 is covered with a hologram dry plate 2 on the same level as the panel P and the periphery of the dry plate 2 is fixed to the opening edge of the casing 1.

The dry plate 2 is composed of a glass base plate 21, a sensitive material 22 coated on the glass base plate 21 and a transparent protecting cover 23.

Figure 2:
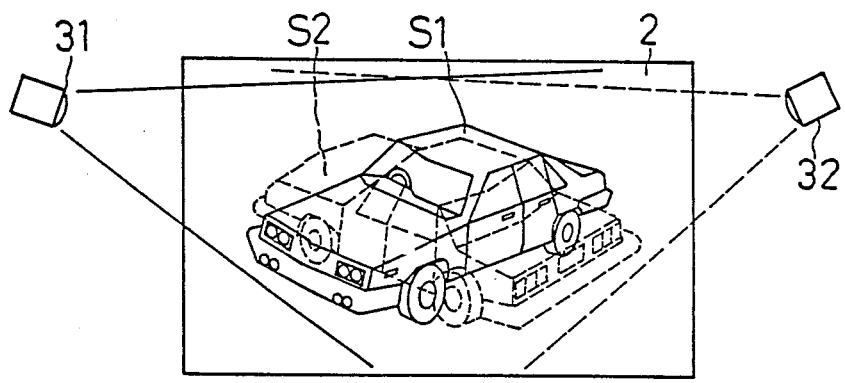
FIG. 2 is a front view of a dry plate, taken in the direction of the arrow A of FIG. 1.

A three-dimensional image S1 seen from the front of a vehicle and a three-dimensional image S2 seen from the rear of a vehicle are multiply recorded as light interference fringes on the dry plate 2 as shown in FIG. 2.

White lamps for image reproduction 31 and 32 are supported by supporting members (not shown) on the right and the left of the front of the dry plate 2. Light from the lamps 31 and 32 enters the dry plate 2 at different incident angles from each other.

Figure 3:
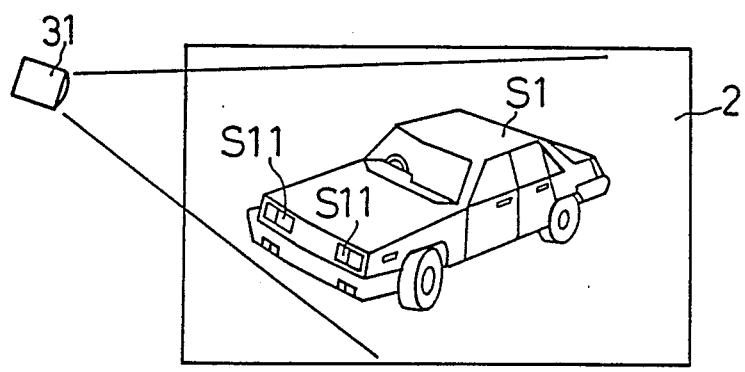
FIGS. 3 and 4 are front views of dry plates on which three-dimensional images are reproduced.
Figure 4:
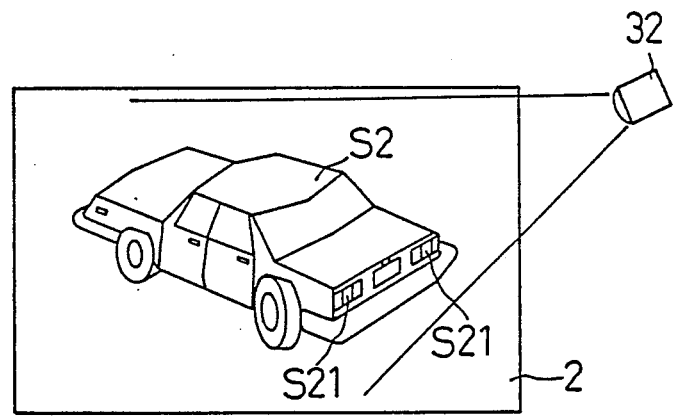

When the lamp 31 is lighted, the three-dimensional image S1 seen from the front of the vehicle is reproduced as shown in FIG. 3 and when the lamp 32 is lighted, the three-dimensional image S2 seen from the rear of the vehicle is reproduced as shown in FIG. 4

A large number of light emission diodes (LED)4 are provided on a print base plate 41 within the casing 1 in the rearward of the dry plate 2. These light emission diodes 4 are provided so as to correspond to the positions of right and left head lamps S11 of the image S1 (FIG. 3) or right and left brake lamps S21 of the image S2 (FIG. 4), for example. The light emission diodes 4 are connected to the control circuit 7 through a connector 42 provided near the under surface of the casing 1.

The lamps 31 and 32, an alarm buzzer 6, a lamp failure sensor 7 and an ignition key 8 are connected to the control circuit 5. And an electric current is supplied to the control circuit 5 from a battery 9.

Figure 6:
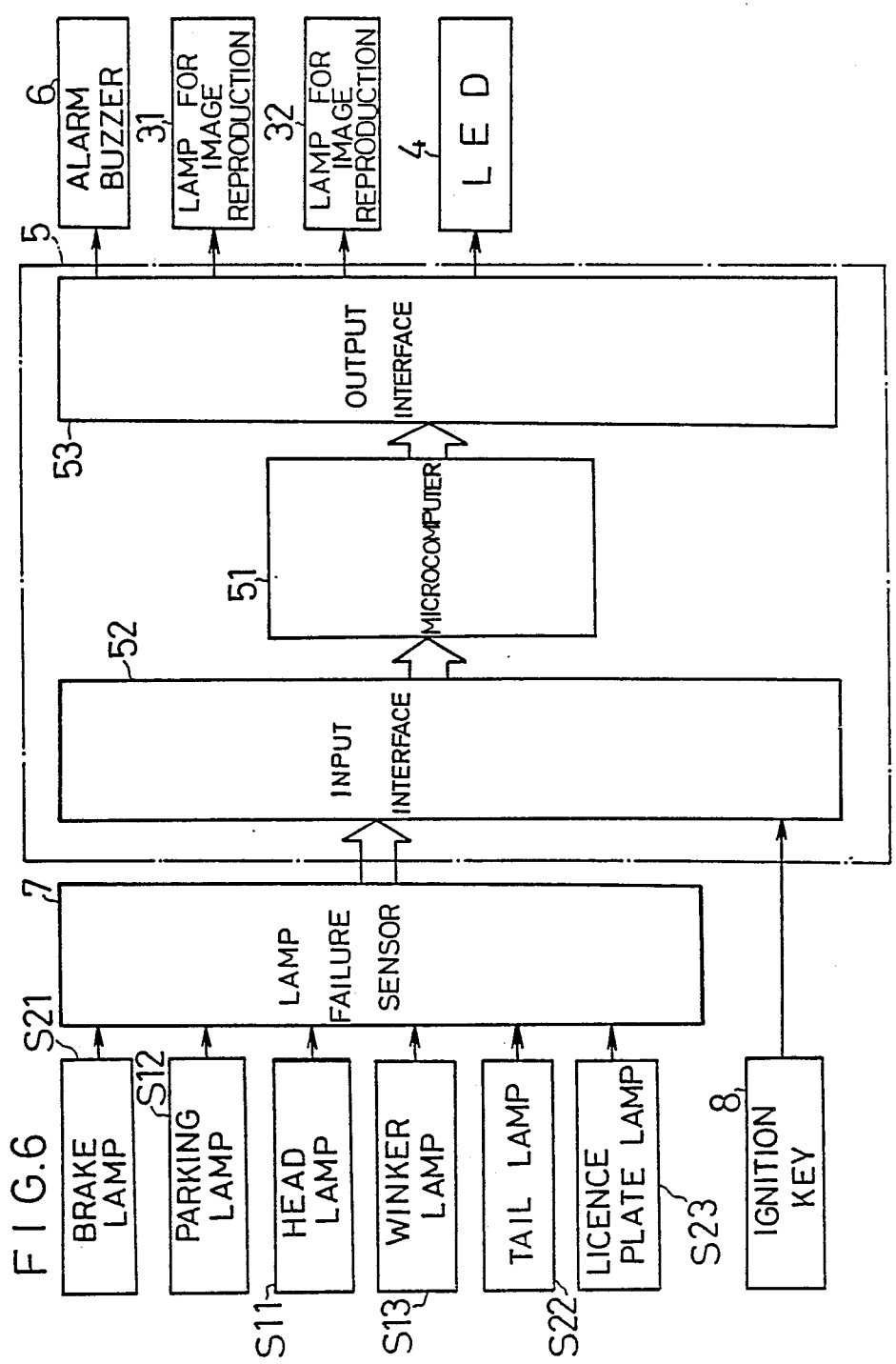
FIG. 6 is a block diagram of a control circuit.

To the lamp failure sensor 7 are connected brake lamps S21, parking lamps S12, head lamps S11, winker lamps S13 tail lamps S22 and a licence plate lamps S23 as shown in FIG. 6. The sensor 7 transmits signals indicating the operation of these lamps and abnormal signals indicating disconnecton or the like.

The control circuit 5 is composed of a microcomputer 51, an input interface 52, and an output interface 53. The lamp failure sensor 7 and the ignition key 8 are connected to the input interface 52.

The alarm buzzer 6, the lamps 31 and 32 and the light emission diodes 4 are connected to the output interface 53.

Figure 7:
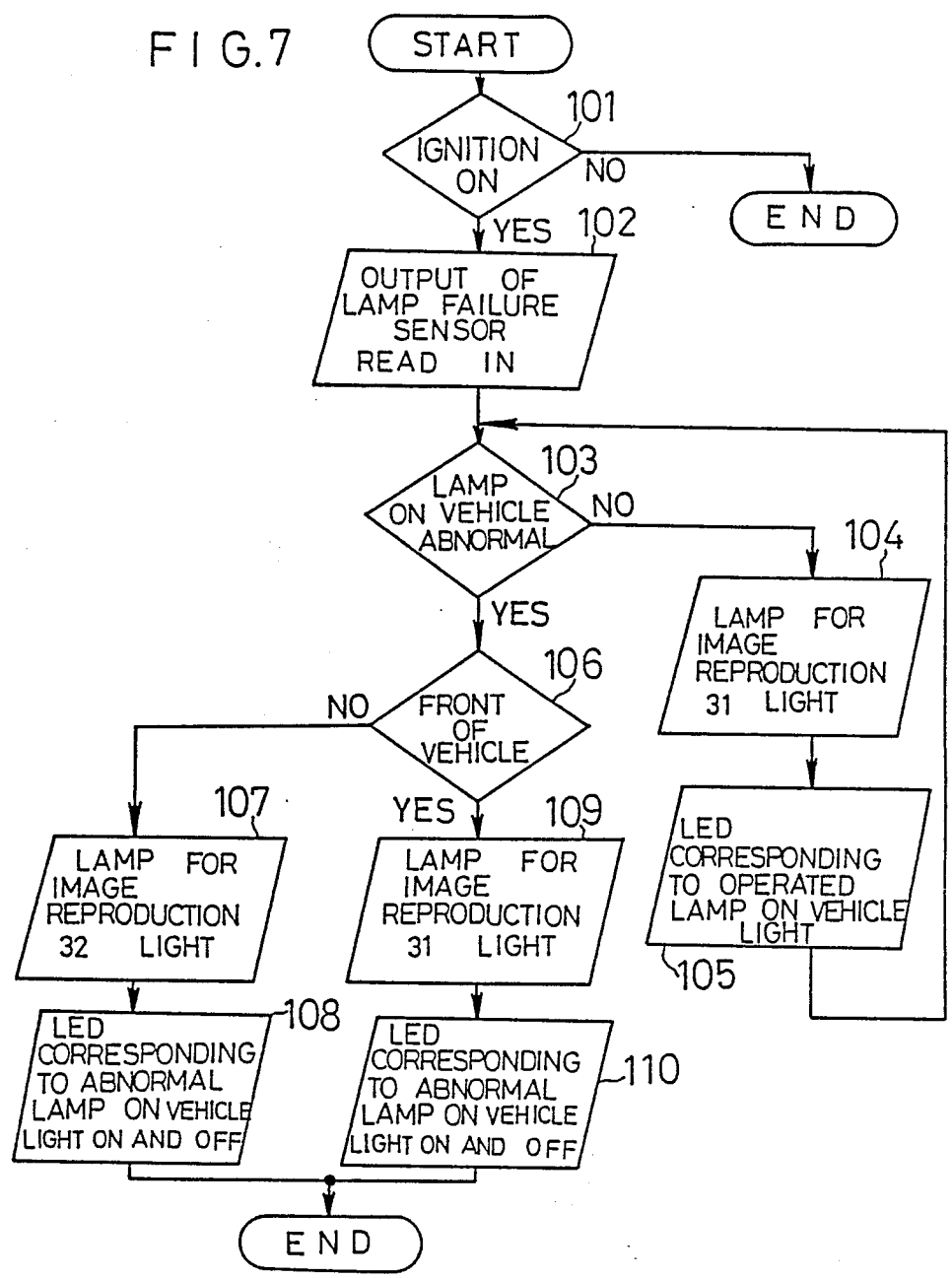
FIG. 7 is a flow chart of a computer program.

Hereinafter, the operation of the monitor display unit of the present invention will be explained in accordance with the program flowchart shown in FIG. 7.

In the step 101, the confirmation whether the ignition key 8 is turned on or off is effected and in the step 102, the output of the lamp failure sensor 7 is read in.

When any of the lamps S11 S13, S21 S23 is not abnormal, the step proceeds from the step 103 to the step 104.

In the step 104, the lamp 31 for image reproduction is lighted to reproduce the three-dimensional image S1 seen from the front of a vehicle. And in the step 105, the light emission diodes 4 corresponding to the operated lamps are lighted.

When one lamp mounted on a vehicle is abnormal in th step 103, the judgement whether the abnormal lamp is positioned in the front of a vehicle or not, is effected in the step 106. When the abnormal lamp is positioned in the front of the vehicle, the lamp 31 is lighted to reproduce the three-dimensional image S1 seen from the front of the vehicle and at the same time the light emission diode 4 corresponding to the abnormal lamp is lighted on and off (Steps 109, 110) and the alarm buzzer 6 is operated.

When the abnormal lamp is positioned in the rear of the vehicle, the lamp 32 is lighted in the step 107 to reproduce the three-dimensional image S2 seen from the rear of the vehicle.

And then the light emission diode 4 corresponding to the abnormal lamp is lighted on and off in the step 108 and at the same time the alarm buzzer 6 is operated.

As described above, according to the monitor display unit of the present invention, the condition of the monitored lamps are displayed on the three-dimensional images of a vehicle in positions corresponding to the actual installed position thereof.

Therefore, the monitor information can be judged speedily and certainly by an occupant.

Furthermore, a plurality of three-dimensioinal images can be previously recorded on a dry plate of the monitor display unit of the present invention. By selectively reproducing these three-dimensional images, a large amount of monitor information can be displayed without requiring large space for the monitor display unit.

The monitor display unit of the present invention can be also employed for monitoring other equipments mounted on a vehicle such as equipments of an engine. In addition, the monitor display unit of the present invention can be also employed for monitoring other than equipments of a vehicle.

In the above described display unit, the lamp for image reproduction can have a green filter therewithin. In this case, cleaner and distinct three-dimensional images can be obtained.

What is claimed is:

1. A monitor display unit comprising:

a hologram dry plate having multiply recorded light interference fringes of a plurality of three-dimensional images which indicate the arrangement of equipments to be monitored;

image reproduction light illuminating means, each being directed toward said hologram dry plate at a different angle from each other for illuminating reproduction light toward said hologram dry plate thereby to reproduce one of said three-dimensional images on said hologram dry plate;

light emitting means, each being provided in a position corresponding to each of said equipments on said three-dimensional images reproduced by said image reproduction light illuminating means; and control means for operating said image reproduction light illuminating means to reproduce a desired one of said three-dimensional images, which indicates the arrangement of equipments to be monitored and for lighting said light emitting means corresponding to the eqiupments to be monitored.

2. A monitor display unit according to claim 1, wherein said hologram dry plate is composed of a glass base plate and sensitive material coated on said glass base plate, and said light emitting means is provided rearward of said glass base plate whereby light emitted by said light emitting means is observed through said hologram dry plate.

3. A monitor display unit according to claim 2, wherein said light emitting means is composed of light emission diodes provided on a printed base plate disposed rearward of said glass base plate so as to be positioned near a rear surface of sid glass base plate.

4. A monitor display unit according to claim 1, wherein said hologram dry plate is provided in an instrument panel of a vehicle whereby said three-dimensional images indicating the arrangement of equipments mounted on the vehicle to be monitored are recorded on said hologram dry plate.

5. A monitor display unit according to claim 4, wherein: on said hologram dry plate, there are recorded a first three-dimensional image of a vehicle seen from the front of the vehicle and a second three-dimensional image of the vehicle seen from the rear of the vehicle; said image reproduction light illuminating means are provided on each of the right and the left of the front of said hologram dry plate thereby to reproduce the first and the second three-dimensional images; said light emitting means are provided so as to correspond to the position of the equipments on the first and the second three-dimensioinal images; said control means operates said image reproduction light illuminating means in accordance with monitor signals from the equipments to reproduce one of the first and the second three-dimensional images and operates said light emitting means corresponding to the monitored equipments on the reproduced three-dimensional image.

6. A monitor display unit according to claim 5, wherein said equipments are lamps mounted on the front or the rear of a vehicle.

* * * * *